United States Patent
Kondo

(12) 
(10) Patent No.: US 6,217,235 B1
(45) Date of Patent: Apr. 17, 2001

(54) BLUR PREVENTING DEVICE FOR CAMERA

(76) Inventor: Takashi Kondo, 104-2 Tsubakikouge, Tsuyama-shi, Okayama-ken, 708-0051 (JP)

( * ) Notice: Subject to any disclaimer, the term of this patent is extended or adjusted under 35 U.S.C. 154(b) by 0 days.

(21) Appl. No.: 09/586,770

(22) Filed: Jun. 5, 2000

(30) Foreign Application Priority Data

Aug. 6, 1999 (JP) ................................................ 11-256081

(51) Int. Cl.[7] ............................ G03B 17/00; G03B 11/00
(52) U.S. Cl. ......................... 396/421; 396/540; 396/544; 396/661
(58) Field of Search ............................. 396/373, 421, 396/535, 540, 544, 661

(56) References Cited

U.S. PATENT DOCUMENTS 4,729,648 * 3/1988 Armstrong ........................... 396/373
5,608,483 * 3/1997 Tseng ................................... 396/373

* cited by examiner

Primary Examiner—David M. Gray
(74) Attorney, Agent, or Firm—Kanesaka & Takeuchi

(57) ABSTRACT

A blur preventing device of a camera includes a base portion having a depressed portion on one side thereof to allow a nose of a user to be inserted therein; a sebaceous matter absorbing layer disposed on a surface of the base portion including the depressed portion; and an adhesive layer disposed on a back surface of the base portion to be detachably attached to a back side of the camera. Since a user can hold the camera by pressing the nose against the back side of the camera through the blur preventing device, a picture without blur can be taken. Moreover, there is no risk of staining the back of the camera with the sebaceous matter since the blur preventing device is provided with the sebaceous matter absorbing layer.

4 Claims, 3 Drawing Sheets

BLUR PREVENTING DEVICE FOR CAMERA

BACKGROUND OF THE INVENTION AND RELATED ART STATEMENT

The invention relates to a device to be attached to a camera for preventing blur in case a picture is taken by holding the camera with hands.

In case a picture is taken by holding a camera with hands, it is said, as a basic principle, that the camera is supported by three points, i.e. both hands and a face of a user, to prevent the picture from being blurred and to take a clear picture. However, it is not easy to prevent the picture from being blurred for a beginner as well as a veteran photographer. Although a lens having a blur preventing function built therein is sold on a market, the lens is very expensive and can not be attached to a camera where the lens can not be exchanged. Thus, this kind of lens is not so popular. Therefore, in order to prevent the blur of the picture, it is necessary to firmly hold the camera with both hands and, at the same time, to allow a face, especially nose, of a user to be pressed against a back side of the camera.

However, when the nose is pressed against the back side or cover of the camera, sebaceous matter of the nose adheres to the back side of the camera to stain the back cover therewith.

There are also devices to be attached to the camera for holding the camera to a body or head of a user. However, such devices are large and are not handy to be used easily together with the camera.

In view of the above-stated problems, the present invention has been made and an object of the invention is to provide a blur preventing device, wherein even if a nose of a user is pressed against a back side of a camera to prevent the blur, the back side is not stained with sebaceous matter of the user.

Another object of the invention is to provide a blur preventing device as stated above, which can be produced at a low cost.

A further object of the invention is to provide a blur preventing device as stated above, which can be attached to a camera without exchanging a lens.

Further objects and advantages of the invention will be apparent from the following description of the invention.

SUMMARY OF THE INVENTION

In order to solve the above-stated problems, a blur preventing device of the invention is formed of a base portion having a depressed portion therein for allowing a user's nose to be inserted therein; a sebaceous matter absorbing layer provided on a surface of the base portion including the depressed portion; and a bonding layer provided at a back surface of the base portion to be detachably attached to a back side of the camera.

Thus, the blur preventing device of the invention can be easily attached to any camera and a desired portion for the user. If the blur preventing device is stained or becomes dirty, the blur preventing device may be exchanged.

DETAILED DESCRIPTION OF PREFERRED EMBODIMENT

With reference to the accompanying drawings, the present invention will be described in detail.

Figure 1:
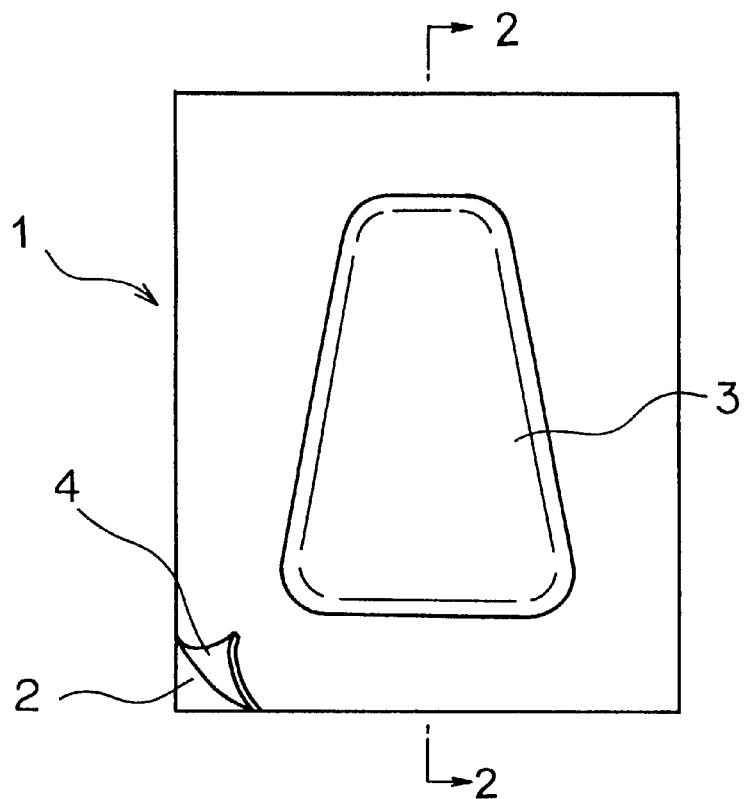
FIG. 1 is a front view of a blur preventing device of the present invention.
Figure 2:
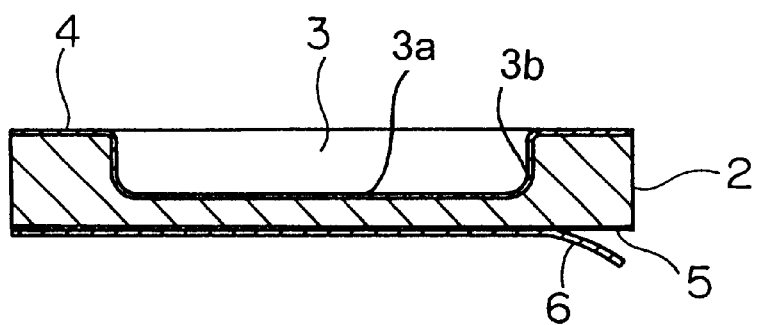
FIG. 2 is a sectional view taken along line 2—2 in FIG. 1.

In FIGS. 1 and 2, reference numeral 1 represents a blur preventing device of an embodiment according to the present invention. The blur preventing device 1 is formed of a base portion 2 made of hard rubber with elasticity, a sebaceous matter absorbing layer 4, and an adhesive layer 5. The base portion 2 has a rectangular board shape, and a depressed portion 3 large enough for receiving a nose of a user or photographer therein is provided on a front side thereof. A shape of the base portion 2 is not limited to an example as shown in the drawings, and may be formed in any shape, such as an ellipse and oval. Also, while a shape and depth of the depressed portion 3 can be suitably set, it is preferable that the depressed portion 3 has a size and depth where a tip of the nose inserted therein presses a bottom surface of the depressed portion when the user holds a camera 11 for taking a picture. For example, the depressed portion 3 has a bottom 3a and a side wall 3b completely surrounding the bottom 3a, and a trapezoidal shape, as shown in FIGS. 1 and 2, but, the depressed portion may be formed in a shape in which the nose is fitted without a space (now shown).

The sebaceous matter absorbing layer 4 is formed on a front surface of the base portion 2 including the depressed portion 3, and bonded thereto by an adhesive. The sebaceous matter absorbing layer 4 is formed of a material for absorbing the sebaceous matter, such as an oil removing paper and sebaceous matter absorbing pad sold on the market.

The adhesive layer 5 may be a two-side adhesive tape or an adhesive applied to the back surface of the base portion 2. A releasing paper 6 is applied on a surface of the adhesive layer 5. The adhesive layer 5 allows the blur preventing device 1 to be fixed to a camera. As the adhesive layer 5, there can be employed an adhesive layer having a bonding strength which does not leave any mark on the camera when the blur preventing device 1 is removed from the camera. Incidentally, not shown, it is also possible to detachably attach the blur preventing device to a back side of the camera by bonding one of detachable fasteners to the back side Of the camera and the other of the fasteners to the back surface of the base portion 2.

Figure 3:
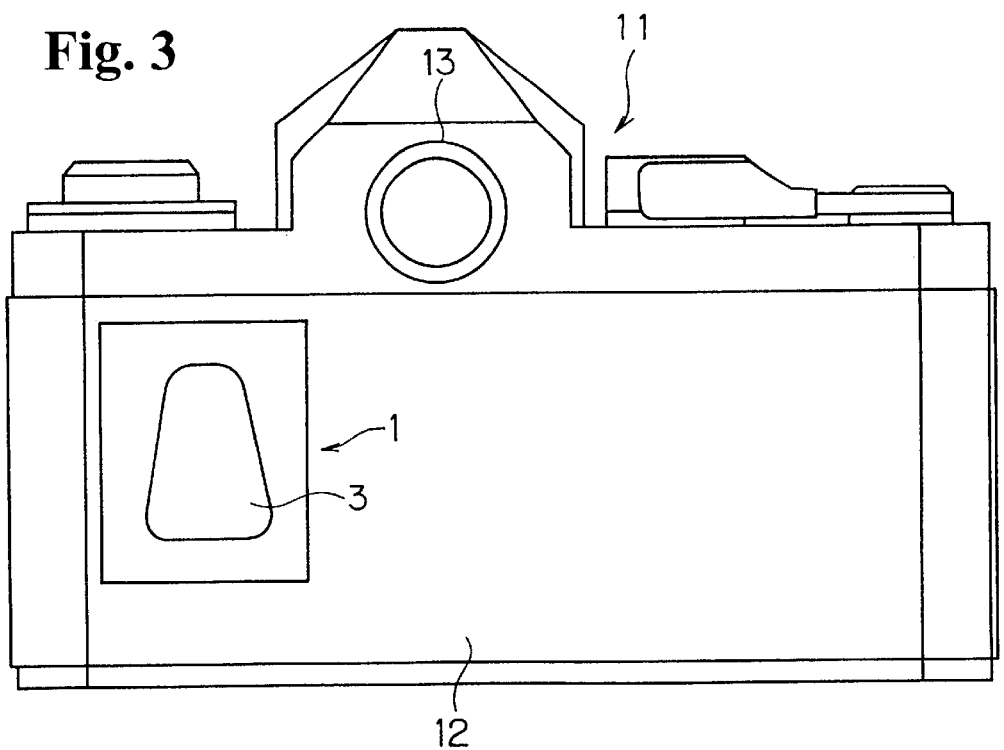
FIG. 3 is a rear view of a camera to which the blur preventing device is attached.
Figure 4:
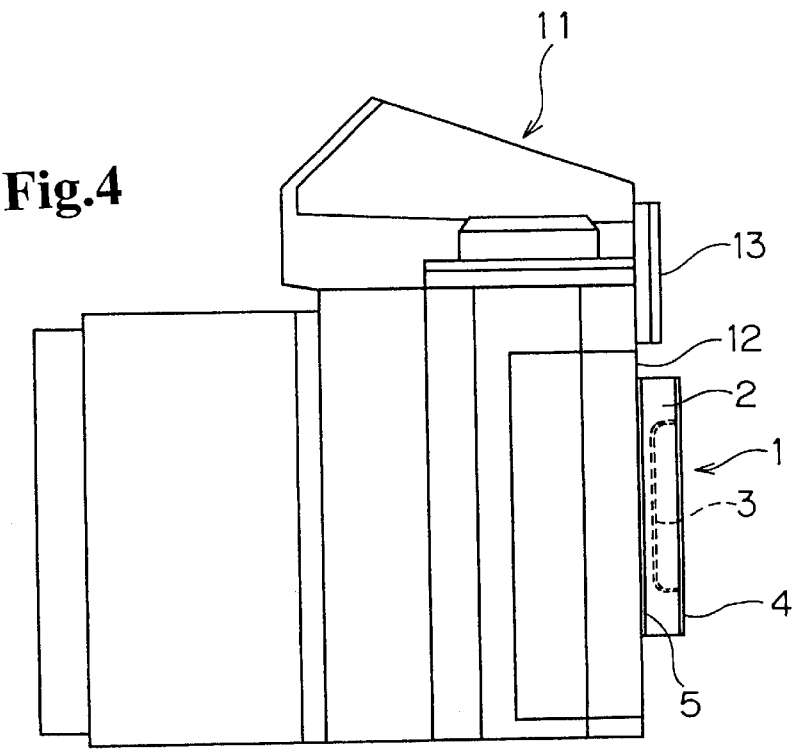
FIG. 4 is a side view of the camera to which the blur preventing device is attached.
Figure 5:
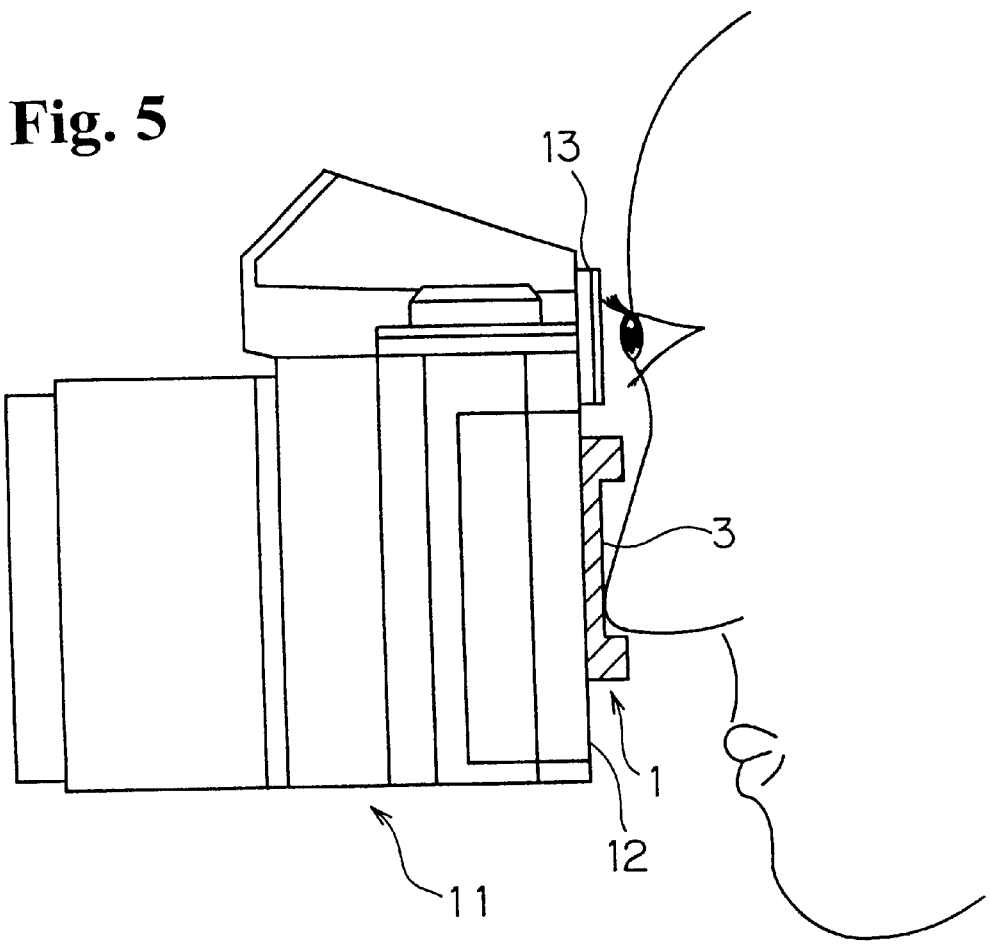
FIG. 5 is a side view of the camera with the blur preventing device showing a using condition.

The blur preventing device 1 is attached to the back side or cover 12 of the camera 11 by the adhesive layer 5 after the releasing paper 6 is peeled off, as shown in FIGS. 3 and 4. The blur preventing device 1 is attached to a position of the camera such that when the user securely holds the camera and sees through a window 13 of a finder, the nose of the user contacts the back cover 12. Accordingly, the attaching position becomes different depending on the using condition of the finder, i.e. a left eye or right eye. Therefore, as shown in FIG. 5, when the user holds the camera 11 for taking a picture, the user's nose is inserted into the depressed portion 3 of the blur preventing device 1 to allow the tip end of the nose to be pressed against the bottom surface of the depressed portion 3 through the sebaceous matter absorbing layer 4, so that the camera does not cause any blur.

Since the user can hold the camera for taking a picture by pressing the nose against the back side or cover of the camera through the blur preventing device, a picture without blur can be taken. Also, since the blur preventing device is provided with the sebaceous matter absorbing layer, the back cover of the camera is not stained and is kept clean. Further, the blur preventing device can be produced at a low cost and applied to a camera without changing a lens.

While the invention has been explained with reference to the specific embodiment of the invention, the explanation is illustrative and the invention is limited only by the appended claims.

What is claimed is:

1. A blur preventing device of a camera comprising:
   a base portion having front and back sides, and a depressed portion formed at the front side to allow a nose of a user to be disposed in the depressed portion, said depressed portion having a bottom and a wall completely surrounding the bottom to thereby form the depressed portion inside the base portion;
   a sebaceous matter absorbing layer disposed on a front surface of the base portion including the depressed portion with the bottom and the wall; and
   an adhesive layer disposed on a back surface of the base portion to be detachably attached to a back side of a camera.

2. A blur preventing device of a camera as claimed in claim 1, wherein said adhesive layer is formed of a two-side adhesive tape.

3. A blur preventing device of a camera as claimed in claim 2, wherein said depression has a trapezoidal shape.

4. A blur preventing device of a camera as claimed in claim 1, wherein said base portion has a rectangular board shape, and is made of hard rubber with elasticity.

* * * * *